United States Patent

Routson et al.

[15] 3,701,384
[45] Oct. 31, 1972

[54] METHOD AND COMPOSITION FOR CONTROLLING FLOW THROUGH SUBTERRANEAN FORMATIONS

[72] Inventors: Willis G. Routson, Walnut Creek, Calif.; Albert L. Caldwell, Houston, Tex.

[73] Assignee: The Dow Chemical Company, Midland, Mich.

[22] Filed: March 11, 1971

[21] Appl. No.: 123,387

[52] U.S. Cl. ................166/292, 166/270, 166/273, 166/281, 61/36 R
[51] Int. Cl. ....E02d 3/14, E21b 33/138, E21b 43/22
[58] Field of Search......166/270, 275, 274, 295, 273, 166/281, 305 R, 292, 294, 300; 252/8.55 D; 61/36 R

[56] References Cited

UNITED STATES PATENTS

| | | |
|---|---|---|
| 2,747,670 | 5/1956 | King et al.................166/292 X |
| 2,990,881 | 7/1961 | Nathan et al. ..........166/300 X |
| 3,281,354 | 10/1956 | Scott et al..................166/283 |
| 3,319,715 | 5/1967 | Parks.........................166/283 |
| 3,343,601 | 9/1967 | Pye.......................166/275 X |
| 3,396,790 | 8/1968 | Eaton ....................166/300 X |
| 3,476,187 | 11/1969 | Harvey ..................166/275 X |

*Primary Examiner*—Stephen J. Novosad
*Attorney*—Griswold & Burdick and Richard W. Hummer

[57] ABSTRACT

A slurry of finely divided inorganic solids, such as silica flour, magnesium oxide, or magnesium or calcium carbonates, silicates or hydroxides, is injected into a porous subterranean formation together with an aqueous composition consisting of a colloidal dispersion of a water-insoluble, inorganic compound formed in an aqueous solution of a high-molecular-weight organic polymeric polyelectrolyte to accomplish plugging of thief zones, fractures or other zones of excessive permeability.

6 Claims, No Drawings

METHOD AND COMPOSITION FOR CONTROLLING FLOW THROUGH SUBTERRANEAN FORMATIONS

BACKGROUND OF THE INVENTION

In the production of petroleum, the existence of highly permeable water-containing zones communicating with the well bore can cause a variety of problems. For example, in producing wells the communication of water-bearing strata with the well bore may cause excessive production of water along with the oil resulting in high pumping costs and a disposal problem for the water which is usually in the form of a brine and, therefore, a potential pollutant. Further, such highly permeable water-bearing zones cause extreme problems when secondary recovery of petroleum by water flooding is attempted. In such operations it is found that when the water flood is started a high proportion of the water injected bypasses through the high perm zone into the producing wells without sweeping any appreciable amount of oil ahead of it from the oil-containing formations.

In the past, various attempts have been made to plug off such high perm zones by pumping suspensions of finely divided solids thereinto. Materials employed in such attempts have included organic matter, such as ground leather or ground walnut shells and inorganic materials such as clays and finely ground silica. The use of such finely divided solids has frequently been unsuccessful either through failure to plug the high permeability water-bearing zones or through plugging the oil-bearing zones as well as the water-bearing zones. Even when such operations have been successful, it has frequently been at an excessive cost due to the large amounts of finely divided solids required.

SUMMARY OF THE INVENTION

In accordance with the present invention, it has now been discovered that certain modified high molecular weight polymeric polyelectrolytes interact strongly with a limited class of finely divided inorganic solids to produce compositions particularly adapted for controlling the flow of water in overly porous subterranean formations. Suitable inorganic solids are of low solubility in water and include silica flour, magnesium oxide, magnesium and calcium carbonates and magnesium and calcium silicates. The modified polymeric polyelectrolytes employed in accordance with the invention consist of an aqueous colloidal dispersion of a hydrous metal oxide prepared in an aqueous solution of a high-molecular-weight organic polymeric polyelectrolyte such as an acrylamide polymer or copolymer. Preferred modified polymeric polyelectrolytes comprise colloidal aluminum hydroxide formed in the presence of an anionic high molecular weight polyacrylamide or hydrolyzed polyacrylamide and a colloidal dispersion of chromic hydroxide formed in the presence of high molecular weight polyacrylamide or hydrolyzed polyacrylamide. Other suitable modified polymeric polyelectrolytes are disclosed in the copending application of Willis G. Routson, Ser. No. 44,609, filed June 8, 1970.

In their broadest scope, the modified high-molecular-weight polymeric polyelectrolyte compositions employed in the method of the present invention are those aqueous dispersions wherein a stable colloidal dispersion of a water-insoluble inorganic solid is formed in an aqueous solution of a water-soluble, organic polymeric polyelectrolyte, wherein said polyelectrolyte would normally flocculate said inorganic solid if the dispersion thereof had not been formed in the presence of said polyelectrolyte and wherein the finished aqueous composition is characterized by resistance to displacement through porous formations and by a viscosity greater than the viscosity for an aqueous solution containing the same concentration of polymeric polyelectrolyte without said inorganic solid. Preferred inorganic solids for use in the compositions of the invention include the hydroxides of aluminum, chromium, cadmium, cobalt, nickel, copper, tin, iron and zinc. The exact physical nature of these so-called colloidal dispersions is not completely understood since there appears to be an interaction of the inorganic compound with the polymeric polyelectrolyte causing marked effects on the rheological properties of the finished dispersions.

The water-soluble, organic, polymeric polyelectrolytes, which are modified for use in the compositions of the invention, are in general known flocculating agents characterized as substantially linear, high-molecular-weight polymers having sufficient polar groups in or along the polymer chain to render the polymer water-soluble. In the present context, high molecular weight means that the polymers have molecular weights of at least about one million and preferably of over two million. In practice it is preferred to employ water-soluble polymers characterized by a viscosity of at least 4 centipoises, preferably at least 12 centipoises, for a 0.5 percent by weight solution of the polymer in distilled water at 25° C. Representative polymeric polyelectrolytes useful in the invention are water-soluble polymers of acrylamide, acrylic acid, sodium styrenesulfonate and the like and copolymers of such monomers with each other or with other suitable monoethylenically unsaturated monomers such as ethylene, propylene, styrene, methacrylic acid, methacrylamide, vinyl alkanoic esters, vinyl chloride, maleic anhydride and the like. Other suitable polymeric polyelectrolytes are the polymers and copolymers of sodio-sulfoalkyl acrylates and methacrylates, aminoalkyl acrylates and methacrylates and water-soluble salts of copolymers of maleic anhydride with a vinyl-aromatic compound. Another effective class of polymers are the high-molecular-weight polysaccharides produced in certain bacterial fermentations, particularly such polymers produced by Xanthomonas species. The preferred polymeric polyelectrolytes are high-molecular-weight polyacrylamides and hydrolyzed polyacrylamides.

In preparing the modified polymeric polyelectrolyte compositions employed in the invention, any suitable method for generating the colloidal, water-insoluble, inorganic compound may be employed provided said compound is formed in an aqueous solution of the water-soluble organic polymeric polyelectrolyte. In one method of producing the water-insoluble, inorganic compound, a double decomposition reaction is employed. For example, soluble compound embodying a suitable anion, such as hydroxide ion, is dissolved in the aqueous solution of polymeric polyelectrolyte and an aqueous solution of a salt of a metal precipitatible by said anion is added thereto gradually and with sufficiently vigorous mixing to avoid excessive local concentrations of metal ions in the mixture. Alternatively the colloidal inorganic compound can be formed in the solution of polymeric polyelectrolyte by an oxidation or reduction reaction or by altering the pH of a suitable metal salt solution.

In practice, the modified polymeric compositions are generally produced by first preparing by known methods a dilute solution of one of the organic polymeric polyelectrolytes in water or in a suitable inert salt solution such as an oil-field brine and incorporating therein a precipitant, such as a small amount of an alkali metal hydroxide or of an alkaline buffer. Thereafter a dilute solution of a suitable metallic salt, such as a soluble salt of aluminum, chromium or zinc, is added thereto to precipitate the corresponding metal hydroxide, such as, respectively, aluminum, chromium or zinc hydroxide, in the form of a stable, colloidal dispersion of the insoluble metal hydroxide. In large scale operations, the polymer solution containing the anionic precipitant can be prepared batchwise or continuously and the metallic salt solution be pumped into a stream of the polymer solution in a suitable conduit wherein natural or induced turbulence provides for proper mixing to generate the desired colloidal dispersion of insoluble, inorganic compound in the flowing stream of polymer solution. In this manner the colloidal dispersion can be formed in situ immediately before introducing same into a well bore communicating with a subterranean, porous formation.

In certain cases it is convenient to prepare the modified polymeric polyelectrolyte compositions wherein the colloidal inorganic compound is generated in the presence of the polymer by more complex reactions such as oxidation or reduction. For example, it has been found that compositions embodying chromic hydroxide are conveniently prepared by adjusting the pH of a suitable solution of polymeric polyelectrolyte to a value in the range of 6.5 to 8.5, and adding an alkali metal chromate to the solution followed by a strong reducing agent such as sodium hydrosulfite to generate chromic ions in situ, which then form the desired colloidal chromic hydroxide sol.

The concentrations of ingredients in the modified polymeric polyelectrolyte compositions may vary depending upon the degree of fluidity desired and the permeability and porosity of the subterranean formation to be treated. In general the compositions should contain at least 0.003 percent by weight of at least one organic polymeric polyelectrolyte and may contain up to an amount of such polymer which precludes proper mixing of other ingredients by reason of the viscosity of the polymer solution. Preferably the compositions contain from about 0.01 to about 0.2 percent by weight of the polymeric polyelectrolyte. Any suitable amount of the colloidal, water-insoluble, inorganic compound can be employed provided such amount is sufficient to produce the desired increase in the resistance of the finished composition to flow through porous formations. In general, such finished compositions will contain at least about 0.5 part by weight and preferably from about 1 part to about 80 parts by weight of colloidal, water-insoluble, inorganic compound per million parts by weight of finished dispersion composition. The concentration of inorganic compound in the finished composition is, of course, only a minor proportion of the concentration of the polymer therein.

The finely divided, inorganic solids employed in conjunction with the modified polymeric polyelectrolytes in accordance with the invention are of low solubility in water and in oil-field brines and must be sufficiently fine, preferably passing a sieve of 200 meshes to the inch, so as to penetrate a substantial proportion of the pores in the porous subterranean formation. Further, it is critical that such solids interact strongly with the modified polymeric polyelectrolyte solution. The desired type of interaction can be demonstrated in a simple laboratory test as set forth hereinafter in Example 1. Suitable finely divided solids for such use include silica, magnesium oxide, magnesium or calcium silicate, magnesium or calcium carbonate and magnesium or calcium hydroxide. The preferred solid for this use is so-called silica flour consisting of crystalline silica which has been ground to pass a 200-mesh or a 325-mesh screen.

The amount of the finely divided, inorganic solids to be employed will vary over a wide range depending upon such factors as the porosity of the structure to be sealed and/or the existence of large fissures or fractures in the subterranean formation. Thus, for example, improved plugging has been observed with as little as 0.001 percent by weight of silica flour in the modified polymeric polyelectrolyte composition while as much as 30 percent by weight of the finely divided solids may be desirable in such operations as the plugging of fissures in earthen dams. Good results in oil field practice have been obtained with injection of silica flour at a concentration of from about 0.1 to 2 percent by weight into a stream of modified polymeric polyelectrolyte solution which is being introduced into a porous subterranean formation through a well bore.

In its simplest form, the process of the invention is accomplished by injecting an aqueous slurry of one of the aforesaid finely divided solids into a pipe carrying a suitable concentration of modified polymeric polyelectrolyte and the resulting composition is introduced into a permeable subterranean formation in any suitable fashion. In a preferred mode of operation the aqueous dispersion composition is injected into an oil-well bore hole from whence it flows into the adjacent formation. The extent of mobility control or plugging in the water-bearing or permeable formations is manifestly influenced by the differential permeability and porosity of various portions of the formation, by the resistance to flow of the particular composition, by the pressure on the injected fluid and by the duration of the treatment.

The selectivity of the treatment on oil-bearing formations results from the greater effect of the dispersion composition on the mobility of water in the formation than its effect on oil. In some cases it may be preferred to employ a packer or other means of causing localized injection of the dispersion. Such other means include the process for selectively treating oil-bearing formations described in U.S. Pat. No. 3,115,930. Another is the technique involving pressurizing the formation, releasing the pressure and producing aqueous fluids, whereby the aqueous fluids are produced at a faster rate than the oil and thus after a brief period the water-bearing portions of the formation possess a negative energy potential in relation to the oil-bearing portions thereof. Such an energy differential promotes selective uptake of the dispersion composition in the water-bearing portions of the formation.

Regardless of the means adopted to insure, or promote, selectivity of injection of the water blocking dispersion composition into the water zone, or zones, it is desirable to employ a brief acid wash following the plugging treatment if the treated well is to be used for producing oil. Under acid conditions the modified polymeric polyelectrolyte composition described above can usually be dispersed and fluidized in water after contact with the formation. The acid wash in effect involves injecting acid into the formation to remove any plugging agent that may have penetrated the oil zones without entirely removing the plug in the water zone in which the plug has formed to a greater depth than in the oil zone as a result of the greater permeability of the water zone to the treating dispersion. In the case of treatment of injection wells in a field in which water-flooding is contemplated or in progress, the acid wash procedure is generally unnecessary or even detrimental.

In the plugging of other permeable zones such as leaks in earthen dams, the dispersion may be generated and placed in a position to be carried into the porous formation or channels by the natural flow of water through the leaking zone. In one method of operation, the dispersion composition is prepared in a solution of sufficiently high specific gravity so that the composition can be allowed to flow down the upstream face of the dam and thereby seek out and penetrate the zone wherein leakage is occurring.

In an alternative method of operation the finely divided solids, such as silica flour, and modified polymeric polyelectrolyte composition are introduced sequentially into the porous subterranean formation. In such operations a predetermined amount of finely divided, inorganic solids is slurried in water or other aqueous fluid, such as oil-field brine, and fed into a stream of aqueous fluid while the latter is being injected into a porous subterranean formation. Thereafter the modified polymeric polyelectrolyte composition is injected into the formation through the same means to obtain the interaction of the finely divided solids with said polyelectrolyte composition within the pores and interstices of the formation. In the practice of secondary oil recovery by water flooding it is sometimes found that fractures or high permeability zones allow bypassing of water so that water injected through an injection well appears in one or more producer wells within a few days or even hours without accomplishing the desired sweeping of the oil from the intervening formation. When such gross bypassing is encountered it may be desirable to introduce substantial quantities of a slurry of finely divided solids, for example, a slurry containing several hundred or even several thousand pounds of silica flour, into the injection well and thereafter to inject the aqueous modified polymeric polyelectrolyte composition through the same well until the desired flow control has been obtained as evidenced by an increase in well-head pressure for a desirable input rate of fluid into the well.

In many instances, good results in flow control have been obtained by employing as little as 5 pounds of silica flour injected into a subterranean formation over a period of 24 hours by dispersing said amount of silica flour into a modified polymeric polyelectrolyte composition. Typically the polyelectrolyte composition is made up in oil field brine and contains from about 0.05 to about 0.12 percent by weight of a high-molecular-weight, water-soluble, partially hydrolyzed polyacrylamide modified by a content of from about 10 to about 80 parts by weight of chromic hydroxide, formed in the presence of the polymer, per million parts of finished composition. In practice, the combination of silica flour with the modified polymeric polyelectrolyte composition may be injected at any convenient rate, typically at a rate of from about 200 to about 1,500 barrels per day depending upon such factors as the size of the well and the porosity of the formation and the like. Alternatively the silica flour may be injected in increments of about 2 to 5 pounds put in during a period of 20 to 60 minutes and repeated one or more times per day over a period of several days.

The following examples illustrate the invention but are not to be construed as limiting.

EXAMPLE 1

A high-molecular-weight, partially hydrolyzed polyacrylamide, characterized by a viscosity of about 14 centipoises at 25° C. for a 0.3 percent by weight solution thereof in aqueous 4 percent sodium chloride solution adjusted to a pH of 7 and having about 22 percent of the original carboxamide groups hydrolyzed to sodium carboxylate groups, is dissolved in water and diluted with brine to provide a solution containing 3 percent by weight of sodium chloride and 0.025 percent by weight of the polymer. Acid is added to said solution to adjust same to a pH of 5–6, chromic sulfate solution is added to provide about 10 parts by weight of chromium per million parts of the solution and ammonium hydroxide solution is then added to readjust the pH to about 7.2 to produce the desired modified polymeric polyelectrolyte composition. To 50 milliliters of said composition there is added with stirring 20 milliliters of an aqueous slurry containing 10 milliliters of silica flour in tap water. Large curds of the silica are formed. After this mixture has stood for several hours it is poured onto a 16-mesh wire screen and after the retained solids have drained for about 5 minutes, the screen and solids are held in the stream of water about 6 inches below the exit of a fast-flowing faucet. The solids show good cohesion and it requires 40 seconds under the stream of water to wash same through the screen.

EXAMPLE 2

The procedure of Example 1 was repeated exactly except that various finely divided inorganic solids were substituted for the silica flour of Example 1 with successive portions of the modified polymeric polyelectrolyte. It was found that finely ground magnesium oxide and fine asbestos fibers interacted very strongly with the polyelectrolyte forming solids so strong that they could not be readily washed through the 16-mesh screen. Calcium carbonate gave a granular curd which required 35 seconds to wash through the screen. In contrast, gypsum, zinc oxide, ferric oxide, kaolin and charcoal did not form solid masses of appreciable strength even though good flocculation of the solids was obtained.

EXAMPLE 3

In a Canadian oil field in which secondary oil recovery is being attempted employing an oil-field brine as the driving fluid it is found that a portion of the formation is so highly permeable that the brine solution bypasses from the injection wells to the producing wells without accomplishing the desired areal sweep of the oil. One of the injector wells is found to be taking large quantities of brine solution with a well-head pressure of 0 p.s.i. at an injection rate of 1,200 barrels per day of injection. In order to increase the pressure and decrease the injection rate, a treating fluid consisting of a high molecular-weight partially hydrolyzed polyacrylamide and a solution of sodium dichromate are employed.

The polymer solution employed contained about 650 parts by weight of a hydrolyzed polyacrylamide, similar in characteristics to that described in Example 1, per million parts of the aqueous brine employed for the water flood, said polymer being available commercially from The Dow Chemical Company under the trademark PUSHER 700. Prior to introducing the polymer into the solution the latter is treated by introduction of sodium hydrosulfite ($Na_2S_2O_4$) to remove oxygen therefrom and to leave an excess of about 20 parts by weight of hydrosulfite per million parts of injection fluid. A second treating solution is prepared by dissolving sodium dichromate in water at a concentration of 2 pounds per gallon and said treating solution is metered into the polymer solution at the well head at a rate to provide 40 parts by weight (equivalent to about 14 parts by weight of chromic ion) per million parts of the flooding medium. The hydrosulfite reduces the chromate to chromic ion, in situ, which thereupon forms the desired chromic hydroxide colloid in the presence of the polymer. Injection is continued for 5 days. Another treating solution is made by mixing 10 to 25 lbs. of silica flour in 1 to 2 gallons of water. This slurry is injected at the well head at a concentration of 0.1 to 2 percent by weight two to three times daily, using approximately 50 pounds of silica flour per day for 6 days. Injection is continued for a period of 6 days at a rate of from 1,200 to 600 barrels of polymer solution plus chromate per day. During this period, injection rate and pressure changed from 1,200 barrels of solution per days at 0 p.s.i. to 615 barrels per day at over 110 p.s.i.

Feeding of chromate and polymer solutions is then discontinued but the well-head pressure remains at a desirably high level during subsequent injection of brine solution thus indicating control of mobility in the excessively permeable zone in the subterranean formation.

We claim:

1. In a method for controlling mobility of aqueous fluids in subterranean formations which comprises injecting into a porous subterranean formation, an aqueous colloidal dispersion of a water-insoluble, inorganic compound prepared in an aqueous solution of an organic polymeric polyelectrolyte, the improvement which comprises introducing a slurry of finely divided solids into said formation prior to completion of the injection of said colloidal dispersion, said solids being selected from the group consisting of crystalline silica, magnesium oxide, magnesium carbonate, magnesium silicate, calcium carbonate and calcium silicate.

2. The method of claim 1 wherein the finely divided solids are introduced intermittently during the injection of the colloidal dispersion.

3. The method of claim 1 wherein the finely divided solids consist of silica flour.

4. The method of claim 3 wherein the colloidal dispersion consists of colloidal chromic hydroxide formed in the presence of a water-soluble, high-molecular-weight, partially hydrolyzed polyacrylamide.

5. A method in accordance with claim 1 wherein the slurry of finely divided solids is introduced into the porous formation and the colloidal dispersion is thereafter introduced into said formation by the same injection means.

6. A method in accordance with claim 1 wherein the colloidal dispersion consists of a colloidal hydroxide of aluminum, chromium, cadmium, cobalt, nickel, copper, tin, iron or zinc formed in the presence of a water-soluble, high-molecular-weight polyacrylamide or hydrolyzed polyacrylamide.

* * * * *